United States Patent
Assinder et al.

(10) Patent No.: US 6,371,619 B1
(45) Date of Patent: Apr. 16, 2002

(54) VEHICLE EXTERIOR MIRROR

(75) Inventors: Andrew J. Assinder, Bognor Regis; Graham Rehill, Chichester, both of (GB)

(73) Assignee: Britax Wingard Limited (GB)

( * ) Notice: Subject to any disclaimer, the term of this patent is extended or adjusted under 35 U.S.C. 154(b) by 0 days.

(21) Appl. No.: 09/523,002

(22) Filed: Mar. 10, 2000

(30) Foreign Application Priority Data

Mar. 22, 1999 (GB) ............................................. 9906491

(51) Int. Cl.[7] .............................. G02B 5/08; G02B 7/182
(52) U.S. Cl. ..................... 359/841; 359/871; 359/872; 359/877; 248/477; 248/478; 248/900
(58) Field of Search ................................. 359/841, 871, 359/872, 877; 248/475.1, 478, 479, 483, 488, 900, 477

(56) References Cited

U.S. PATENT DOCUMENTS

| | | | |
|---|---|---|---|
| 2,724,996 A | * | 11/1955 | O'Shei |
| 4,067,528 A | * | 1/1978 | Motting et al. |
| 4,197,762 A | * | 4/1980 | Yamana |
| 4,234,153 A | | 11/1980 | Chihara et al. |
| 4,253,633 A | * | 3/1981 | Takegawa |
| 4,357,076 A | * | 11/1982 | Manzoni |
| 4,523,736 A | * | 6/1985 | Manzoni |
| 4,651,965 A | * | 3/1987 | Vigna et al. |
| 4,877,319 A | * | 10/1989 | Mittelhauser |
| 4,883,349 A | * | 11/1989 | Mittelhauser |
| 4,973,147 A | * | 11/1990 | Fujita et al. |
| 5,005,797 A | | 4/1991 | Maekawa et al. |
| 5,516,073 A | * | 5/1996 | McMahan |
| 5,844,733 A | | 12/1998 | Ravanini |
| 5,889,624 A | * | 3/1999 | Dickenson |

FOREIGN PATENT DOCUMENTS

| | | |
|---|---|---|
| EP | 0 40 5 77 3 | 1/1991 |
| EP | 0 51 9 11 5 | 12/1992 |
| EP | 0 55 1 60 7 A1 | 7/1993 |
| EP | 0 56 7 24 4 | 10/1993 |
| EP | 0 80 7 55 1 A3 | 8/1998 |
| WO | WO 96 23676 | 8/1996 |

* cited by examiner

*Primary Examiner*—Ricky D. Shafer
(74) *Attorney, Agent, or Firm*—Warn, Burgess & Hoffmann, P.C.

(57) ABSTRACT

A vehicle door mirror having a housing. The housing connects to a vehicle door via a stem. An intermediate member is inserted between the housing and the vehicle door to effect relatively smooth abutment between the intermediate member and each of the housing and the vehicle door. The cylindrical stem extends from the housing through the intermediate member and through the vehicle door. The stem includes primary engagement members to engage with complementary engagement members formed in a mounting hole of the door. The engagement members prevent removal from the mounting hole when the stem is in a predetermined orientation. A spring is compressed between the housing and the stem to cause retraction of the stem inward of the housing. Such inward movement urges the primary engagement members into engagement with the complementary engagement members.

18 Claims, 5 Drawing Sheets

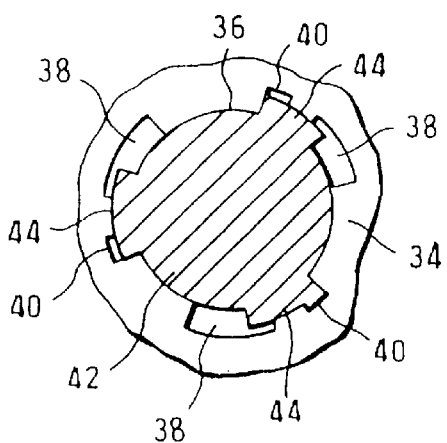
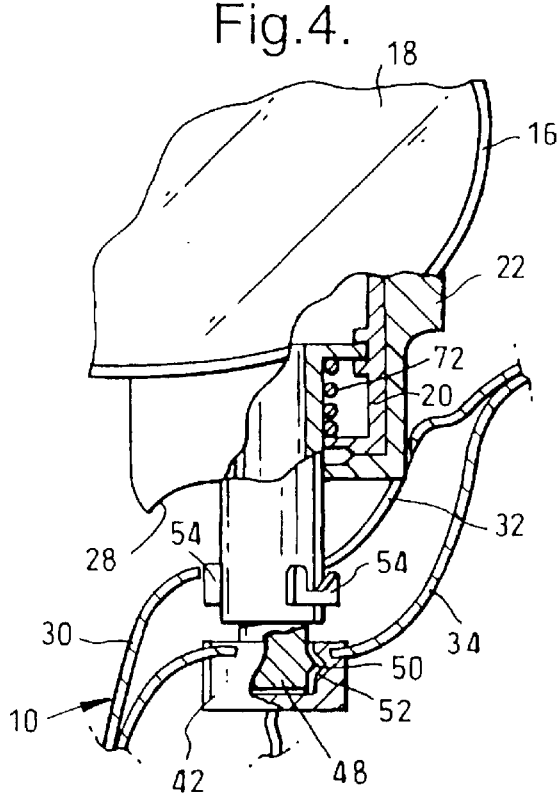
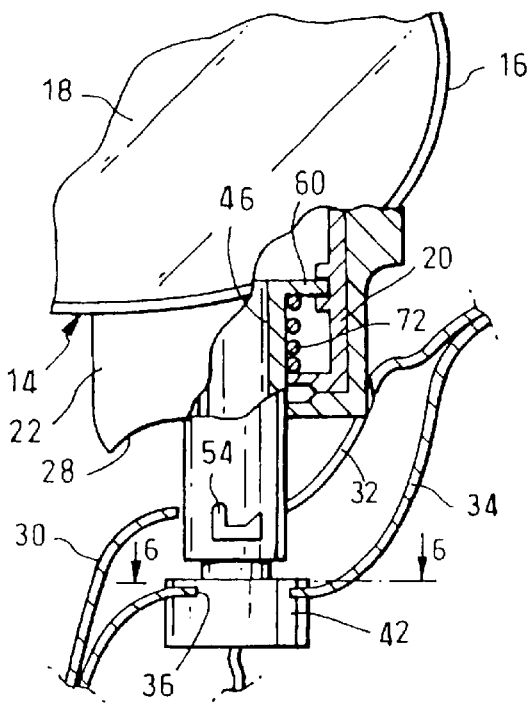
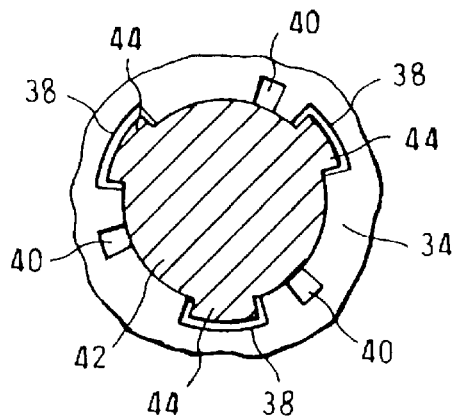

US 6,371,619 B1

VEHICLE EXTERIOR MIRROR

This application claims the benefit of and priority to Great Britain Application No. 9906491.7, filed Mar. 22, 1999.

BACKGROUND

This invention relates to an exterior mirror for a vehicle of the type intended for mounting on a vehicle door and also to a vehicle door having such a mirror mounted thereon.

SUMMARY OF THE INVENTION

Conventional exterior mirrors for vehicles have commonly included a base member with an abutment face adapted to abut against a vehicle door with three studs or pillars projecting from the abutment face so as to project through holes in a structural member of the vehicle door. A screw is then inserted into the end of each stud from inside the vehicle so as to hold the bracket in place. A mirror of this type is described in EP-A-0567244. If electrical connection is required to a mirror adjustment mechanism or a mirror heater, such electrical connections have to be made as a separate operation. Installation of such a mirror is relatively complicated and time consuming. It is an object of the present invention to provide an exterior mirror in which extension is simplified.

According to the invention, a vehicle door mirror comprises a housing, an intermediate member having an abutment surface adapted to abut against a complementary surface of a vehicle door, a cylindrical stem mounted in the housing for axial movement relative thereto, said stem projecting through a hole in said abutment surface so as to engage in a mounting hole in said complementary surface, the stem having radially projecting bayonet formations adapted to engage with complementary bayonet formations on the periphery so as to prevent removal of the stem from the mounting hole when the stem is at a predetermined orientation therein, and a spring engaging between the housing and the stem to cause retraction of the stem inwardly of the housing and thereby to urge the bayonet formations into engagement.

The invention also provides a vehicle door having a door mirror mounted thereon, the door mirror comprising a housing including an intermediate member having an abutment surface adapted to abut against a complementary surface of the door, a cylindrical stem mounted in the housing for axial movement relative thereto, said stem projecting through a hole in said abutment surface so as to engage in a mounting hole in said complementary surface, the stem having radially projecting bayonet formations adapted to engage with complementary bayonet formations on the periphery so as to prevent removal of the stem from the mounting hole when the stem is at a predetermined orientation therein, and a spring engaging between the housing and the stem to cause retraction of the stem inwardly of the housing and thereby to urge the bayonet formations into engagement.

Preferably, the intermediate member of the housing is displaceable relative to the intermediate member thereof in the event of impact, the main body being held in its normal orientation by a detent which is biased into its engaged position by said spring.

The invention also provides arrangements simplifying the establishment of connections to the mirror during installation.

An embodiment of the invention will now be described by way of example, with reference to the accompanying drawings, in which:

For a more complete understanding of the invention, its objects and advantages, reference should be made to the following specification and to the accompanying drawings.

BRIEF DESCRIPTION OF THE DRAWINGS

The drawings, which form an integral part of the specification, are to be read in conjunction therewith, and like reference numerals are employed to designate identical components in the various views:

FIG. 3 is a sectional view along on the line 3—3 of FIG. 2;

FIG. 4 is an elevational similar to FIG. 2 in partial cutaway showing the mirror after a first stage of installation on the door;

FIG. 5 is a view similar to FIG. 4 showing a first stage of installation;

FIG. 6 is a sectional view along the line 6—6 of FIG. 5;

DESCRIPTION OF THE PREFERRED EMBODIMENT

Figure 1:
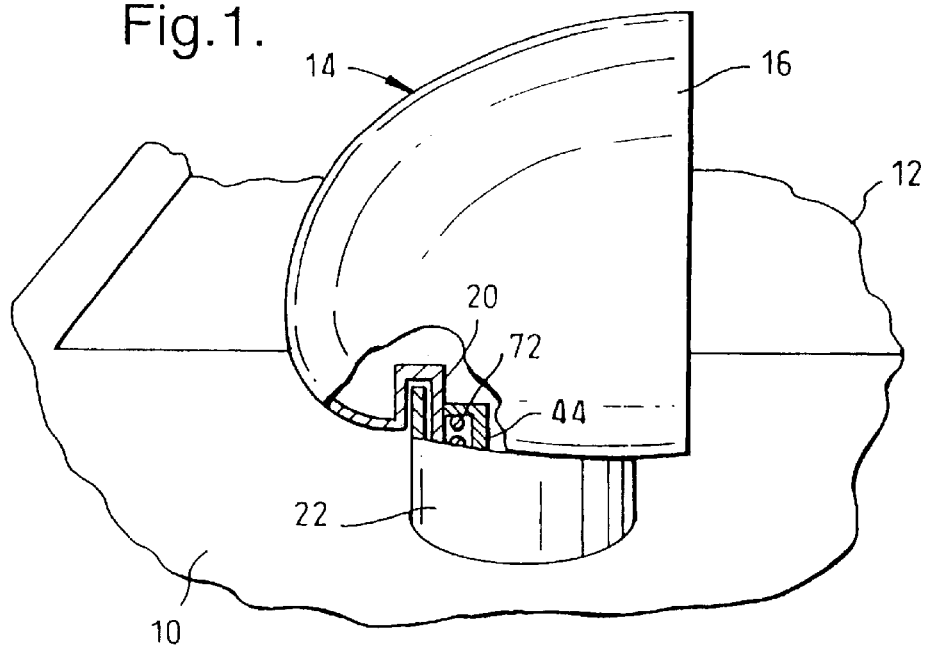
FIG. 1 is a side view of part of a car door fitted with an exterior mirror part of the mirror housing being shown broken away in accordance with a first embodiment of the invention.
Figure 2:
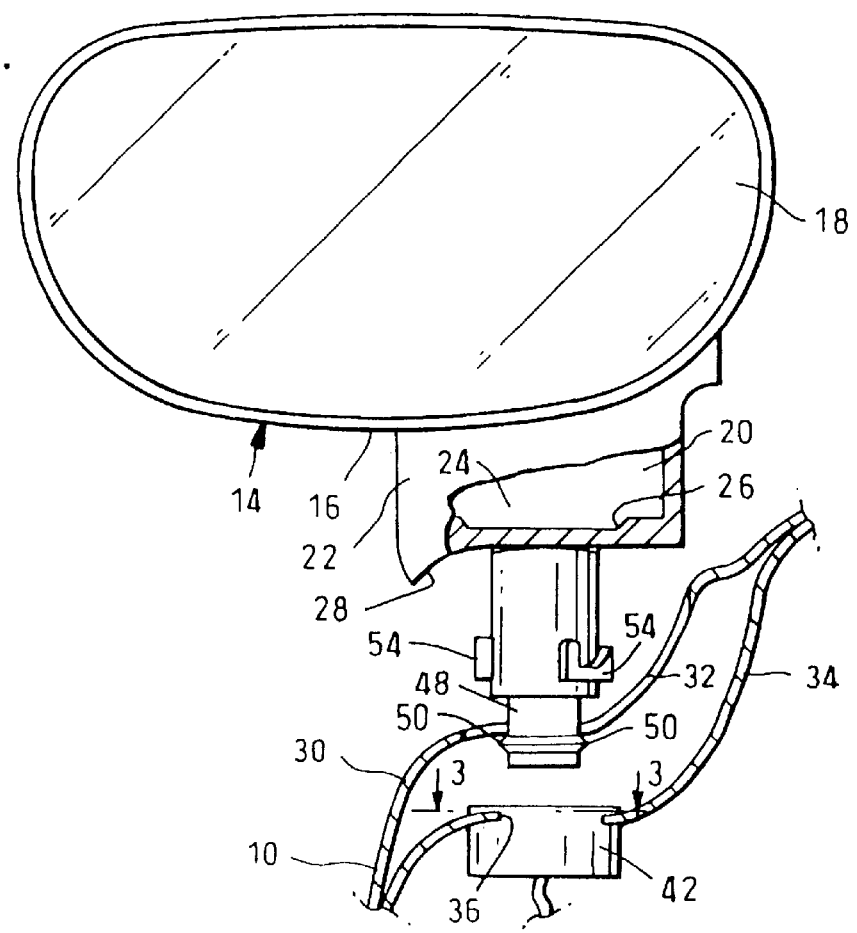
FIG. 2 is a partially broken-away, rear, elevational view, of the mirror shown in FIG. 1 aligned for installation on the vehicle door.

Referring to FIG. 1, a vehicle door 10 contains a window 12 and has a door mirror assembly 14 mounted thereon. As can be seen in FIG. 2, door mirror assembly 14 comprises a housing 16 containing a mirror glass 18. Housing 16 has a downwardly projecting cylindrical foot 20 which is journaled for relative angular and axial movement in an intermediate member 22. Foot 20 has a downwardly projecting detent 24 on its bottom surface which engages in a correspondingly shaped recess 26 in intermediate member 22 so as to retain housing 16 in a predetermined orientation relative to intermediate member 22, as will be explained hereinafter.

Intermediate member 22 has a bottom abutment surface 28 shaped to abut against a complementary surface of outer skin 30 of vehicle door 10 so as to cover an opening 32 therein. Door 10 also has an inner frame 34 containing a generally circular hole 36 (see FIG. 3) which has three relatively long arcuate cut-outs 38 each of which has an associated shorter arcuate cut out 40 adjacent thereto. A multi-contact female electrical connector 42 is mounted in hole 36 with its contacts (not shown) on its top surface. Connector 42 has three radially projecting lugs 44 level with its top surface and dimensioned to easily pass through cut-outs 38. In FIG. 3, lugs 44 are out of alignment with cut-outs 38 so as to hold electrical connector 42 in place prior to installation of mirror 14.

A coupling stem 46 projects downwardly from foot 20 and has a male electrical connector 48 mounted on its bottom end. Connector 48 has pins (not shown) which are arranged to mate with the contacts of female connector 40. These pins and contacts are of conventional design.

When mirror 14 is to be installed on the door 10, it is positioned so that the male connector 48 can pass through the opening 32 and into engagement with female connector 42. A pair of diametrically opposed, resiliently mounted projections 50 on the sides of the male connector 48 are a snap fit in corresponding recesses 52 in female connector 42 so as to retain the two connectors in engagement with one another, as shown in FIG. 4.

Following engagement of projections 50 and recesses 52, mirror 14 is turned about the axis of stem 46 so as to bring the lugs 44 on female electrical connector 42 into alignment with cut-outs 38 of mounting hole or opening 36, as shown in FIGS. 5 and 6. Female connector 40 is now free to be moved downwardly clear of inner frame 34 of the door to the position shown in FIGS. 7 and 8 because lugs 54 on the sides of the stem 46 enter cut-outs 38 during this downward movement. Downward movement continues until bottom abutment surface 28 on intermediate member 22 comes into abutment with outer skin 30 of vehicle door 10 (or primary engagement members).

Figure 7:
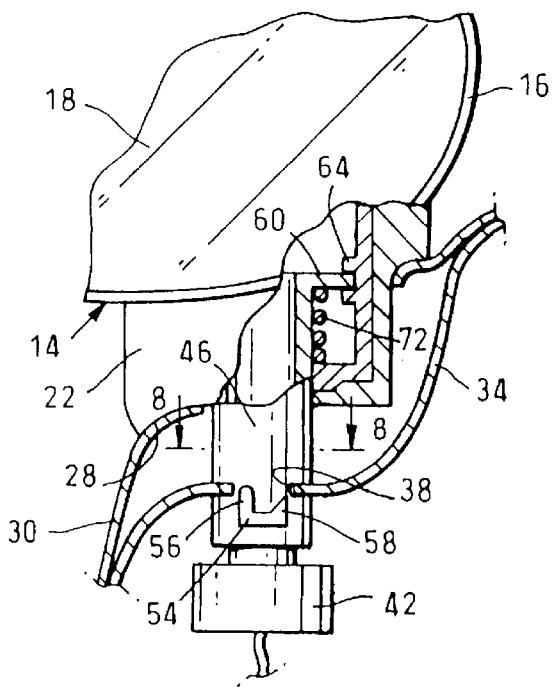
FIG. 7 is a view, similar to FIG. 4 showing a third stage of insertion.
Figure 8:
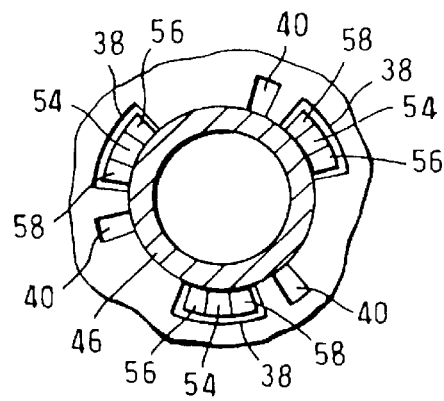
FIG. 8 is a sectional view along the line 8—8 of FIG. 7.
Figure 9:
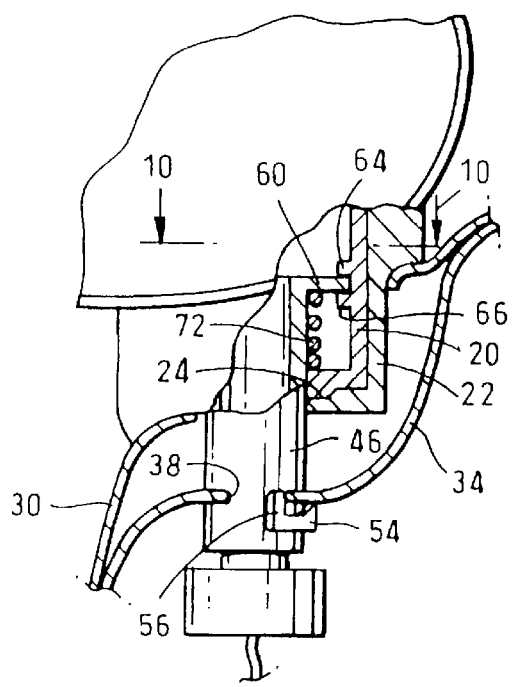
FIG. 9 is a view similar to FIG. 4 showing the mirror in a fourth stage of installation.

As can be seen in FIG. 7, each lug 54 is generally L-shaped, having a vertical portion 56 and a ramped portion 58 on the outer end of its horizontal part. The next step of the assembly involves turning mirror 14 counter-clockwise (as viewed from above) to bring the vertical portion 56 of each lug 54 into engagement with an edge of cut-out 38, as shown in FIG. 9. This resists further angular movement of stem 46. Each of ramp portions 58 of L-shaped lugs 54 is now aligned with one of the shorter arcuate cut-outs 40.

Figure 10:
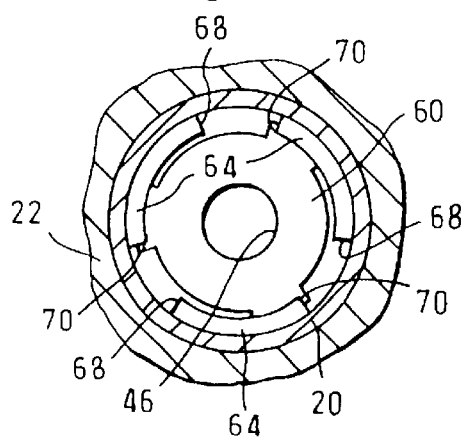
FIG. 10 is a sectional view along the line 10—10 of FIG. 9.

The top of stem 46 has an outwardly projecting flange 60 which engages between inwardly facing upper and lower flanges or ribs 64 and 66 on foot 20. Lower rib 66 is continuous. Upper rib 64 has three arcuate cut-outs 68 (FIG. 10). Similarly, flange 60 on stem 46 has cut-outs leaving three projecting lugs 70 which are dimensioned to pass through cut-outs 68, in FIGS. 9 and 10, and to engage upper rib 64. A compression spring 72 engages between the bottom surface of flange 60 and the bottom of foot 20 to hold lugs 70 in engagement with upper rib 64. Previously, the friction due to spring 72 has caused the stem 46 and the foot 20 of the housing 16 to move simultaneously, keeping the spring 72 in its compressed condition.

Figure 11:
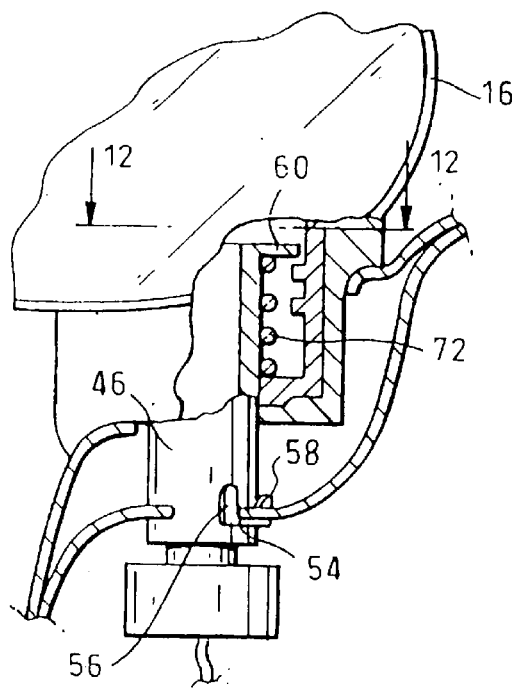
FIG. 11 is a view similar to FIG. 4 showing the mirror fully installed on the vehicle door.
Figure 12:
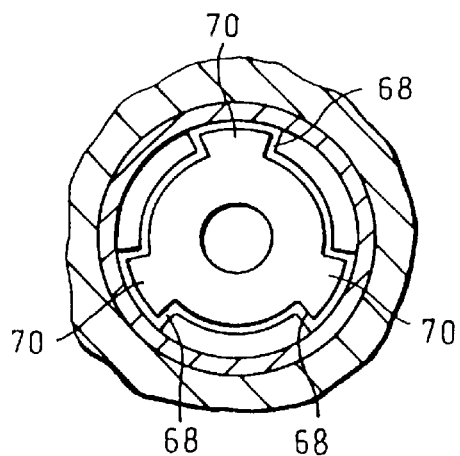
FIG. 12 is a sectional view along the line 12—12 of FIG. 11.

Because the engagement of vertical portions 56 of the L-shaped lugs 54 with the edges of cut-outs 38 prevents further angular movement of stem 46, continued angular movement of housing 16 causes lugs 70 (or second primary engagement members) on flange 60 to come into alignment with cut-outs 68. This allows the compression spring 72 to displace stem 46 upwardly relative to housing 16 so that ramped portions 58 of L-shaped lugs 54 engage the shorter arcuate cut-outs 40 in inner frame 34, thus holding stem 46 against rotation in either direction, as shown in FIGS. 11 and 12.

Figure 13:
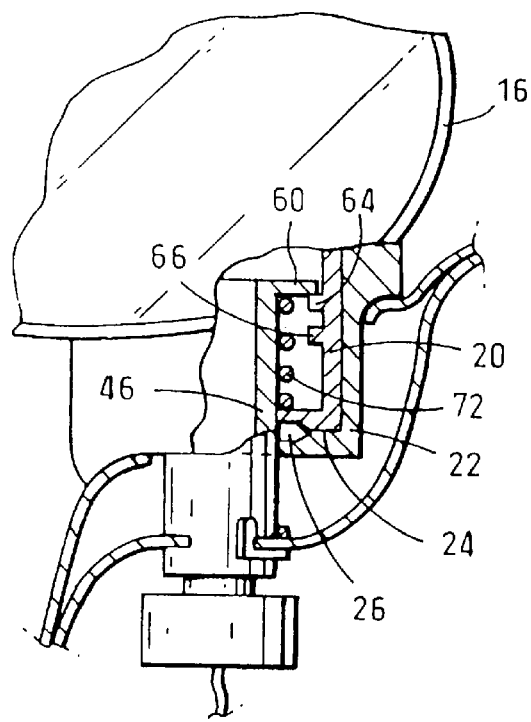
FIG. 13 is a view similar to FIG. 4 showing the mirror in a preliminary state of disengagement from the vehicle door.
Figure 14:
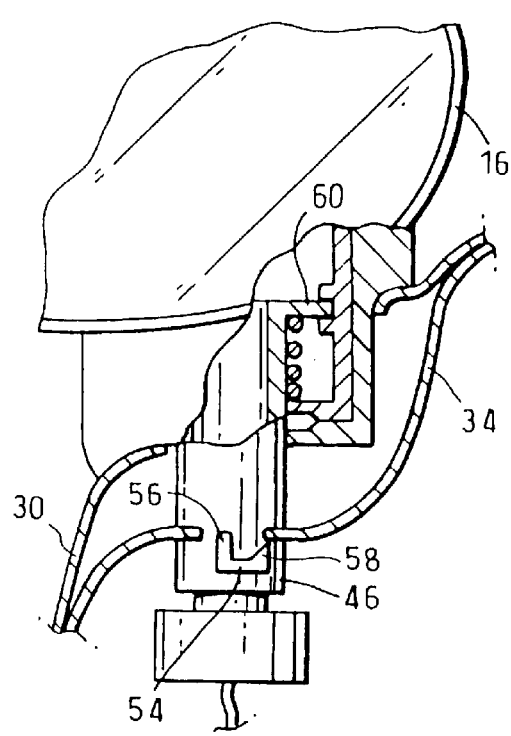
FIG. 14 is a view similar to FIG. 4 showing the mirror in a condition in which it can be removed from the vehicle door.

If housing 16 is subject to impact from the front or from the rear, detents 24 on the bottom surface of the foot 20 ride up the edges of recesses 26 in intermediate member 22, compressing the spring 72, as shown in FIG. 13. Lugs 70 on the flange 60 are now just above top upper rib 64 on foot 20. Mirror housing 16 and its foot 20 are therefore free to move relative to both intermediate member 22 and stem 46, which remain stationary relative to one another.

Figure 15:
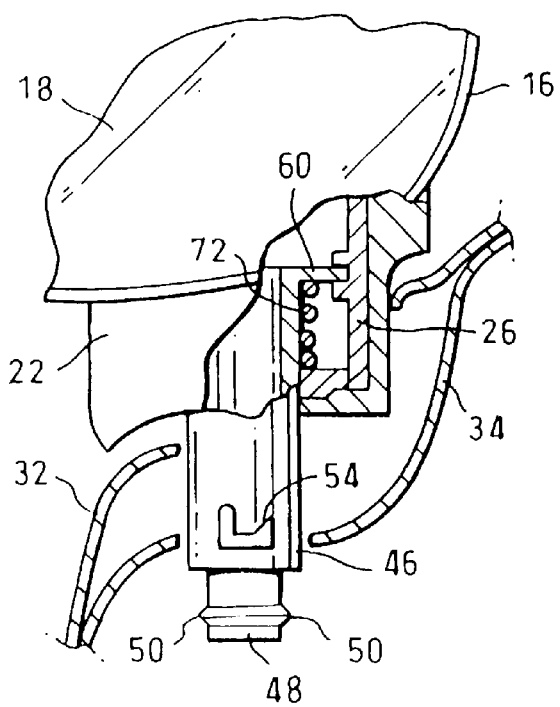
FIG. 15 is a elevational view in partial cutaway similar to FIG. 4 showing the mirror in the process of being removed from the vehicle door.

If it is desired to remove the mirror 14 from the door 10, the mirror housing 16 is first displaced forwardly or rearwardly as shown in FIG. 13. Next, the interior trim of the door 10 is removed and a tool (not shown) is applied to the bottom of stem 46 to rotate it clockwise (as viewed from above) so that the ramped portions 58 on the lugs 54 ride down against the edges of the cut-outs 40 in the inner door frame 34, displacing lugs 70 on the flange 60 to between upper and lower ribs 64 and 66 on foot 20. Further angular movement of mirror housing 16 moves lugs 70 to a position in which they engage under upper rib 64. Compression spring 72 remains compressed while lugs 54 on stem 46 are moved into alignment with larger arcuate cut-outs 38 in inner door frame 34. Female connector 42 can then be disconnected manually and housing 16 is lifted off door 10, as shown in FIG. 15.

Figure 17:
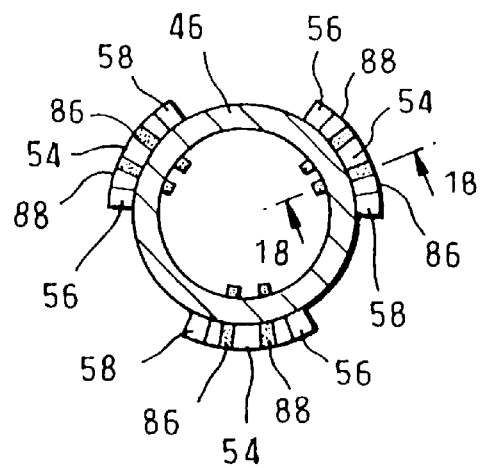
FIG. 17 is a cross-sectional view taken along the line 17—17 of FIG. 16.
Figure 16:
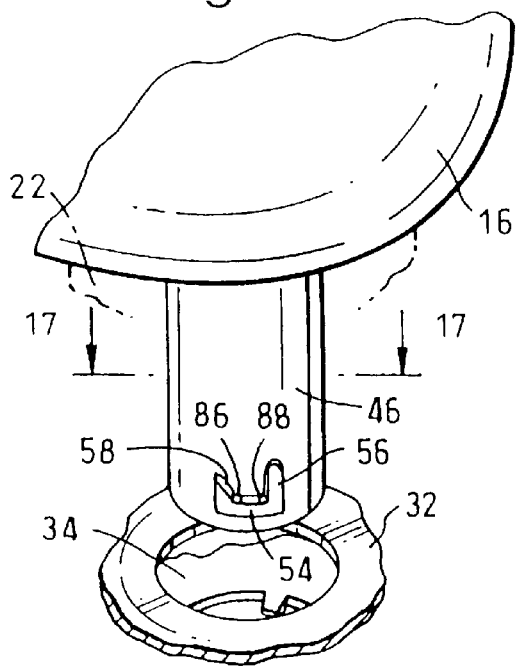
FIG. 16 is a perspective view of part of a second embodiment of the invention.
Figure 18:
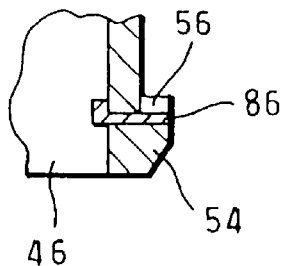
FIG. 18 is a cross-sectional view taken along the line 18—18 of FIG. 17.
Figure 19:
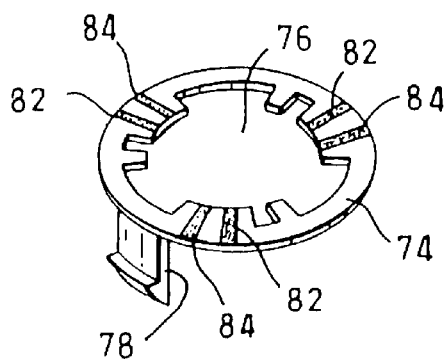
FIG. 19 is a perspective view from below of a contact ring for the embodiment shown in FIG. 16.

In a second embodiment of the invention, the female and male electrical connectors 42 and 48 are replaced by electrical contacts 86 and 88 formed on the upper surfaces of the horizontal part of each of lugs 54 between vertical portions 56 and ramped portions 58, as shown in FIGS. 16 to 18. Female connector 42 is replaced by a plastics ring 74 (see FIG. 19) which has an opening 76 of identical shape to the opening 36 in the inner door frame 34 and which is held in place therein by resilient lugs 78. Contact pairs 82 and 84 are positioned on the bottom surface of ring 74 so as to engage with contacts 86 and 88 when stem 46 is in the position illustrated in FIG. 11. Otherwise, this embodiment is identical with that described with reference to FIGS. 1 to 15. More electrical contacts may be provided if six are insufficient.

While the invention has been described in its presently preferred form, it is to be understood that there are numerous applications and implementations for the present invention. Accordingly, the invention is capable of modification and changes without departing from the spirit of the invention as set forth in the appended claims.

What is claimed is:

1. A vehicle door mirror comprising:
    a housing;
    an intermediate member having an abutment surface adapted to abut against a complementary surface of a vehicle door;
    a cylindrical stem having a first end mounted to the housing for axial movement relative thereto, the stem having a second end projecting through a hole in the abutment surface so as to engage in a mounting hole in the door and having radial first primary engagement members adapted to engage with first complementary engagement members on the periphery of the mounting hole so as to prevent removal of the stem from the mounting hole when the stem is in a predetermined orientation with respect to the mounting hole; and a spring compressed between the housing and the stem to cause retraction of the stem inwardly of the housing, thereby urging the first primary and first complementary engagement members into engagement.

2. The vehicle door mirror according to claim 1 wherein the first end of the stem has second primary engagement members, the second primary engagement members adapted to engage with second complementary engagement members formed on the housing to hold the stem in a protracted position against the action of the spring, wherein angular movement of the housing relative to the door after engagement of the first primary and first complementary engagement members causes disengagement of the second primary and complementary engagement members.

3. The vehicle door mirror according to claim 2 further comprising:

a first electrical connector having interlocking formations adapted to engage with the periphery of the mounting hole; and a second electrical connector mounted on the second end of the stem and adapted to engage the first electrical connector to cause disengagement of the interlocking formations from the periphery of the mounting hole to enable the stem to be inserted therein.

4. The vehicle door mirror according to claim 2 further comprising a first set of electrical contacts arranged on the first primary engagement members and adapted to engage a second set of electrical contacts arranged on the first complementary engagement members.

5. The vehicle door mirror of claim 2 wherein the stem couples the housing to the intermediate member, wherein a detent in the housing maintains the housing in its normal orientation relative to the intermediate member, and wherein the detent is biased into its engaged position by the spring so that the housing is displaceable relative to the intermediate member in the event of impact.

6. The vehicle door mirror of claim 2 wherein the second primary engagement members are defined by a flange projecting from the stem having cut-out sections formed therein, and the second complementary engagement members are formed by a flange projecting from the housing having cut-out section formed therein.

7. The vehicle door mirror according to claim 1 further comprising:

a first electrical connector having interlocking formations adapted to engage with the periphery of the mounting hole; and a second electrical connector mounted on the second end of the stem and adapted to engage the first electrical connector to cause disengagement of the interlocking formations from the periphery of the mounting hole to enable the stem to be inserted therein.

8. The vehicle door mirror according to claim 1 further comprising a first set of electrical contacts arranged on the first primary engagement members and adapted to engage a second set of electrical contacts arranged on the first complementary engagement members.

9. The vehicle door mirror of claim 1 wherein the stem couples the housing to the intermediate member, wherein a detent in the housing maintains the housing in its normal orientation relative to the intermediate member, and wherein the detent is biased into its engaged position by the spring so that the housing is displaceable relative to the intermediate member in the event of impact.

10. The vehicle door mirror of claim 1 wherein the first primary engagement members have a bayonet shape, and the first complementary engagement members defined by a cut-out in the periphery of the mounting hole.

11. A vehicle door assembly comprising:

a vehicle door;

a housing having a detent;

an intermediate member having an abutment surface adapted to abut against a complementary surface of the vehicle door;

a cylindrical stem having a first end mounted to the housing for axial movement relative thereto, the stem having a second end projecting through a hole in the abutment surface so as to engage in a mounting hole in the vehicle door and having radial first primary engagement members adapted to engage with first complementary engagement members on the periphery of the mounting hole so as to prevent removal of the stem from the mounting hole when the stem is in a predetermined orientation with respect to the mounting hole, and wherein the first end of the stem has second primary engagement members, the second primary engagement members adapted to engage with second complementary engagement members formed on the housing to hold the stem in a protracted position, wherein angular movement of the housing relative to the door after engagement of the first primary and first complementary engagement members causes disengagement of the second primary and complementary engagement members; and a spring compressed between the housing and the stem to cause retraction of the stem inwardly of the housing, thereby urging the first primary and first complementary engagement members into engagement, wherein the stem couples the housing to the intermediate member and the detent in the housing maintains the housing in its normal orientation relative to the intermediate member, and wherein the detent is biased into its engaged position by the spring so that the housing is displaceable relative to the intermediate member in the event of impact.

12. The vehicle door assembly according to claim 11 further comprising:

a first electrical connector having interlocking formations adapted to engage with the periphery of the mounting hole; and a second electrical connector mounted on the second end of the stem and adapted to engage the first electrical connector to cause disengagement of the interlocking formations from the periphery of the mounting hole to enable the stem to be inserted therein.

13. The vehicle door assembly according to claim 11 further comprising a first set of electrical contacts arranged on the first primary engagement members and adapted to engage a second set of electrical contacts arranged on the first complementary engagement members.

14. The vehicle door mirror of claim 11 wherein the first primary engagement members have a bayonet shape, and the first complementary engagement members defined by a cut-out in the periphery of the mounting hole.

15. The vehicle door mirror of claim 11 wherein the second primary engagement members are defined by a flange projecting from the stem having cut-out sections formed therein, and the second complementary engagement members are formed by a flange projecting from the housing having cut-out section formed therein.

16. A vehicle door mirror comprising:

a housing having a detent;

an intermediate member having an abutment surface adapted to abut against a complementary surface of a vehicle door;

a cylindrical stem having a first end mounted to the housing for axial movement relative thereto, the stem having a second end projecting through a hole in the abutment surface so as to engage in a mounting hole in the vehicle door and having radial first primary engagement members adapted to engage with first complementary engagement members on the periphery of the mounting hole so as to prevent removal of the stem from the mounting hole when the stem is in a predetermined orientation with respect to the mounting hole, and wherein the first end of the stem has second primary engagement members, the second primary engagement members adapted to engage with second complementary engagement members formed on the housing to hold the stem in a protracted position against the action of the spring, wherein angular movement of the housing relative to the door after engagement of the first primary and first complementary engagement members causes disengagement of the second primary engagement members; and a spring compressed between the housing and the stem to cause retraction of the stem inwardly of the housing, thereby urging the first primary and first complementary engagement members into engagement, wherein the stem couples the housing to the intermediate member and the detent in the housing maintains the housing in its normal orientation relative to the intermediate member, and wherein the detent is biased into its engaged position by the spring so that the housing is displaceable relative to the intermediate member in the event of impact.

17. The vehicle door assembly according to claim 16 further comprising:

a first electrical connector having interlocking formations adapted to engage with the periphery of the mounting hole; and a second electrical connector mounted on the second end of the stem and adapted to engage the first electrical connector to cause disengagement of the interlocking formations from the periphery of the mounting hole to enable the stem to be inserted therein.

18. The vehicle door mirror of claim 17 wherein the first primary engagement members have a bayonet shape, and the first complementary engagement members defined by a cut-out in the periphery of the mounting hole and wherein the second primary engagement members are defined by a flange projecting from the stem having cut-out sections formed therein, and the second complementary engagement members are formed by a flange projecting from the housing having cut-out section formed therein.

* * * * *